(12) United States Patent
Berlinsky

(10) Patent No.: US 6,633,743 B1
(45) Date of Patent: Oct. 14, 2003

(54) REMOTE WIRELESS COMMUNICATION DEVICE

(75) Inventor: Allan M. Berlinsky, Morris Township, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/777,986

(22) Filed: Dec. 24, 1996

(51) Int. Cl.[7] ................................................. H04B 7/15
(52) U.S. Cl. ........................ 455/11.1; 455/422; 455/423
(58) Field of Search ................................. 455/403, 422,
455/423, 425, 432, 445, 456, 457, 9, 11.1,
507, 517, 524, 525, 8, 67.1, 67.4, 133;
375/213, 224, 228; 370/241, 246; 340/425.1,
825.54, 825.69, 825.72

(56) References Cited

U.S. PATENT DOCUMENTS

| | | | | |
|---|---|---|---|---|
| 4,748,655 A | * | 5/1988 | Thrower et al. | ............. 455/555 |
| 4,977,399 A | | 12/1990 | Price et al. | ............ 340/825.44 |
| 5,241,701 A | * | 8/1993 | Andoh | ........................ 455/133 |
| 5,410,753 A | * | 4/1995 | Szabo | ........................ 455/67.4 |
| 5,479,479 A | * | 12/1995 | Braitberg et al. | ........... 455/457 |
| 5,509,028 A | * | 4/1996 | Marque-Pucheu | .......... 455/524 |
| 5,652,765 A | * | 7/1997 | Adachi et al. | ................ 455/18 |
| 5,675,371 A | * | 10/1997 | Barringer | ........................ 455/9 |
| 5,915,208 A | * | 6/1999 | Collyer | ...................... 455/11.1 |

FOREIGN PATENT DOCUMENTS

| | | | | |
|---|---|---|---|---|
| EP | 0 344 624 | 12/1989 | ........... H04B/17/00 |
| EP | 0 651 586 | 5/1995 | ............ H04Q/7/22 |
| GB | 2 294 378 | 4/1996 | ............ H04Q/7/34 |
| JP | 5-122119 | 5/1993 | ............ H04B/7/26 |
| JP | 7-264124 | 10/1995 | ............ H04B/7/26 |

* cited by examiner

Primary Examiner—Lester G. Kincaid

(57) ABSTRACT

A device is disclosed for facilitating communication with a remote apparatus. The remote apparatus has control functionality and is located within a wireless network. The device comprises a terminal unit having means for transmitting a signal and receiving a signal. The transmitted signal includes an identification of the terminal unit. Additionally, the device includes a control interface operatively connected between the terminal unit and the apparatus. The control interface interfaces signals of the terminal unit with the control functionality of the apparatus.

8 Claims, 2 Drawing Sheets

REMOTE WIRELESS COMMUNICATION DEVICE

BACKGROUND OF THE INVENTION

1. Field of Invention

The invention generally relates to communication devices. More specifically, it relates to a remote wireless communicator device that provides a communication link with an apparatus in a wireless network.

2. Background

In many applications, an apparatus is remotely located such that no wireline communication exists, and/or on-site operator control is either impractical, difficult, or otherwise economically prohibitive. Consequently, the apparatus usually operates autonomously. Examples of such apparatus include telecommunication hardware such as repeater or reradiator stations, microwave towers, and satellite dishes, machinery such as pumps, compressors, HVAC equipment, and switches, and navigational devices such as lights, radar stations, buoys, and beacons.

A repeater station in a telecommunication system is exemplary of the problems encountered with controlling and monitoring a remote apparatus. Traditionally, a repeater is either provided with a wireline modem, or allowed to run autonomously. Neither approach, however, is satisfactory. Wirelines are expensive and unavailable in many geographic regions. An autonomous repeater, on the other hand, provides no indication of a malfunction, and frequently one is realized only after receiving customer complaints. A need therefore exists to establish a communicative link with a remote apparatus to facilitate control and diagnostic functions. The present invention fulfills this need among others.

SUMMARY OF THE PRESENT INVENTION

The present invention relates to a device for facilitating communication with a remote apparatus. The remote apparatus has control functionality and is located within a wireless network. The device comprises a terminal unit having means for transmitting a signal and receiving a signal. The transmitted signal includes an identification of the terminal unit. Additionally, the device includes a control interface operatively connected between the terminal unit and the apparatus. The control interface interfaces signals of the terminal unit with the control functionality of the apparatus.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The present invention is directed to a device for facilitating communication with a remote apparatus located in a wireless network. By establishing a communicative link with the remote apparatus, it can be controlled, monitored, and tested by a user located off-site.

The term "remote apparatus" as used herein broadly refers to a device or piece of equipment that is remotely located or otherwise situated such that wireline communication is unavailable, impractical or otherwise not preferred. Additionally, the apparatus has control functionality but on-site control by an operator is either impossible, impractical, difficult, or otherwise economically prohibitive. Control functionality, as used in this context, broadly refers to controllable operation variables of the apparatus. Typical control functions include on/off, increase/decrease power, fault detection, alarm enunciation, and status query among others. Examples of remote apparatus include telecommunication hardware, such as repeater or reradiator stations, microwave towers, and satellite dishes, machinery, such as pumps, compressors, HVAC equipment, and switches, navigational devices, such as lights, radar stations, buoys, and beacons, and surveillance/reconnaissance devices, such as sonar buoys and remote cameras. Frequently, these devices are physically inaccessible or otherwise difficult to reach, and the need to operate them is sporadic so that manning them full time is inefficient and cost prohibitive.

Figure 1:
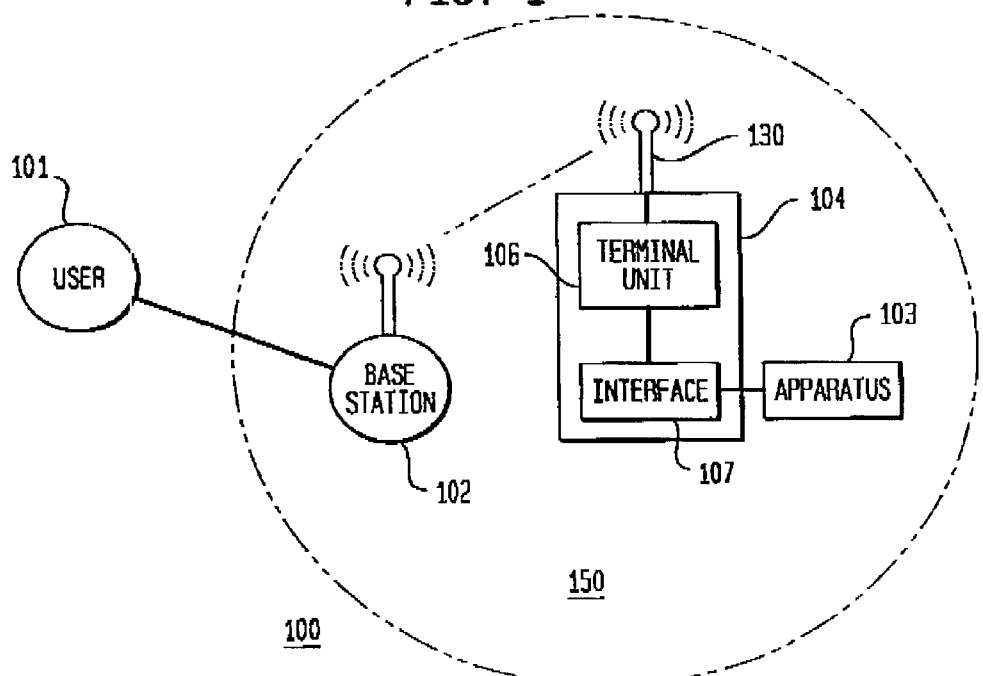
FIG. 1 shows a schematic diagram of a simple embodiment of the communicator device on a remote apparatus in a typical wireless network.

The present invention may be practiced to provide a communication link between a user and a remote apparatus in any wireless network environment. A simple embodiment of the communicator device in a wireless network is shown in FIG. 1. In FIG. 1, a user 101 within the network is operatively connected to a base station 102 via a primary communicative link 120. The base station 102 services an area 150 which includes the remote apparatus 103.

A communicator device 104 is operatively connected to the apparatus 103. In a simple embodiment, the communicator device 104 comprises a terminal unit 106 operatively connected to apparatus 103 through a control interface 107. As used herein, "terminal unit" broadly refers to a device that receives and transmits signals on one or more channels over a wireless medium in cooperation with a base station. The terminal unit should also transmit a signal that is indicative of the particular apparatus 103. The technology for such telecommunication is well known in the art. An example of a terminal unit is a cellular phone. It should be understood, however, that a terminal unit in accordance with the present invention may have more or less features than a cellular phone. The terminal unit transmits and receives signals via an antenna 130.

The control interface 107 serves to connect the terminal unit 106 with the apparatus 103. Its primary function is to interface messages received and transmitted by the terminal unit 106 with the control functions of the apparatus 103. The configuration of the interface 107 can vary from a simple terminal strip to a programmable computer depending upon the interface requirements of the apparatus 107 and the desired functionality of the communicator device 104. For example, if the apparatus responds to an analog 0–10 volt DC signals, then the interface would comprise the circuitry for converting phone signals to the appropriate analog DC signal and visa versa. In a more complex application, the interface may apply logic to either the apparatus or terminal unit signals. For example, if the interface 107 receives an alarm signal from the apparatus, it might automatically perform a test on the apparatus 103 based on the alarm, and forward the test results to the base station via the terminal unit 106. In another embodiment, the interface 107 may perform a detailed diagnostic test involving multiple steps and calculations based upon just a few commands from a remote user via the terminal unit 106. It should therefore be understood that the configuration of the interface may vary, however, such technology is known in the art, or would be obvious given the functional requirements.

According to the invention, a user can control the apparatus 103 remotely via the communicator device 104. The specific operation of the communicator device and its functionality depends upon the application. In a simple operation, the user (not shown) may place a call to the communicator device 104 from anywhere in the cellular network, and, once connected, enter commands through a keypad, or other known means for transmitting messages. The apparatus would then perform some function according to the message and possibly provide an indication of status back to the user. Alternatively, the communicator device 104 may place a call to the user to apprise the user of a change in status or other event. The user in this context may be a person or a computer configured to operate the apparatus.

The present invention is particularly well suited for providing communication means to telecommunication equipment such as repeaters and reradiators in cellular networks. Repeaters are used to increase cell area, cover dead spots and increase air interface power. In general, a repeater receives the air interface RF, amplifies and reradiates the RF information in the appropriate direction. A reradiator operates in a similar fashion except it identifies and filters corrupted messages and noise in the signal. As used herein, the terms repeater and reradiator are used interchangeably and the invention may be practiced with either apparatus equally as well. Since the very nature of a repeater is to provide cellular service to remote or limited access areas, repeaters themselves are often remote or inaccessible. Thus, the communicator device of the present invention is particularly well suited for a repeater.

Figure 2:
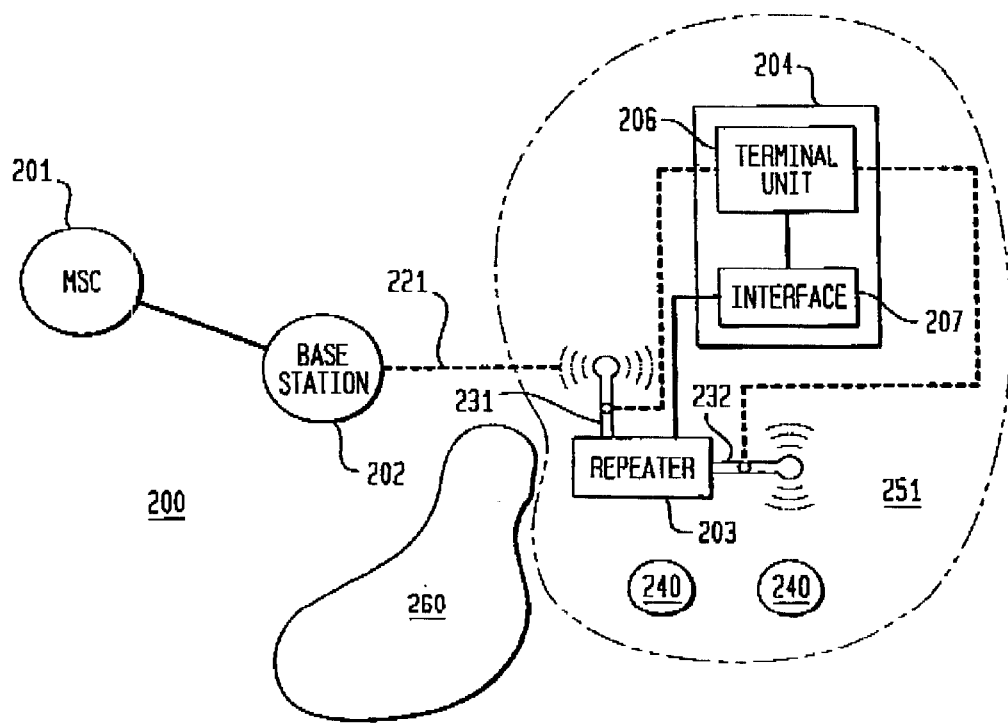
FIG. 2 shows a schematic diagram of the communicator device for providing a communicative link between a base station and a repeater.

A basic embodiment of the invention as applied to a repeater is shown schematically in FIG. 2. As shown, the cellular system 200 has a mobil switching center (MSC) 201 communicatively connected to at least one base station 202. Typically, this communication link 220 may be a wireline or a wireless microwave connection, although the nature of the connection is not critical to the present invention. In this case, to provide coverage around an obstacle 260, such as a mountain range, the base station is communicatively connected to a repeater 203. The repeater 203 repeats and amplifies transmissions between the base station 202 and at least one mobil phone unit 240 in area 251. The signal transmission between the repeater 203 and the base station 202 occurs over a host cell communication link 221 at a conventional cellular frequency.

Connected to the repeater, is a remote wireless communicator device 206. Although its configuration can vary, in this embodiment, the device 206 comprises a terminal unit 206 and interface means 207 for interfacing messages with the repeater's control functions. The interface means 207 may provide for both data and control signal transmission.

In accordance with the present invention, the system 200 allows for remote control of the repeater 203. Via the communicator device 204, the repeater's operation parameters such as on/off and power level may be controlled. The communicator device can also relay hardware alarms and other repeater hardware signals from the repeater 203 back to the base station 202.

In addition to control and alarm functions, a preferred embodiment of the communicator device includes diagnostic functionality. The diagnostic functionality provides for application level testing. As used herein, the term "application level testing" broadly refers to testing wherein the performance of the repeater is tested. That is, rather than just indicating a hardware fault alarm, an application test requires the hardware to perform its intended function as if it were serving a subscriber terminal. Application level tests may include RF call trace, subscriber loop back test, and other types of operation, administration, and maintenance (OA&M) tests. Additionally, these tests may include procedures specifically tailored, at the application level, for testing the repeater and the RF interface connections. Much of the diagnostic functionality needed to perform these tests is known and practiced in the art. For example, many cellular phones contain the means to perform RF call trace, subscriber loop back test, and other types of OA&M tests.

The communicator device 204 facilitates application level tests by using its terminal 206 as a sample terminal from the subscriber area 251. For example, a loop back test would be performed by first having the user command the communicator device 204 to put its terminal in a loop back mode. Next, a signal would be transmitted from the base station 202 to the repeater 203, where the signal would be amplified and retransmitted to the terminal unit 206. The terminal unit 206 in turn would transmit the signal back to the repeater wherein it would be amplified and transmitted back to the base station 202. This eliminates the need to have an actual subscriber's terminal used for the test. Moreover, having the test terminal connected to the repeater avoids the additional variables of an air interface between the repeater and the subscriber terminal. Thus, the present invention provides for more reliable application level testing without the need for an actual subscriber.

In applications involving cellular system apparatus, it is desirable to avoid the use of a terminal unit antenna dedicated to the terminal unit due to the interference it may cause with the normal transmission/reception functions of the equipment and the added complexity of multiple antennas. For this reason, it is desirable to use the air/hardware interface means already present in the apparatus for the terminal unit.

The repeater 203 has a host cell interface means, which typically comprises a base station antenna 231, and a subscriber interface means which typically comprises a subscriber antenna 232. The base station antenna 231 serves to receive and transmit signals to and from the base station 202. Likewise, the subscriber antenna 232 serves to transmit and receive signals to and from the subscriber mobile units in the particular area that the repeater serves.

In one embodiment, the terminal unit 206 operatively connects to either the host base station antenna 231 or the subscriber antenna 232. The determination of which antenna to connect to the terminal unit depends somewhat on the intended function of the communicator device 204. If the intended function of the communicator device is simply to control the functionality of the repeater 203, then it is preferable to operatively connect the terminal unit to the host base station antenna 231. This enables communication with the communicator device independent of the repeater. In other words, since the terminal unit is connected to the antenna that receives the signal from the base station, it will receive signals notwithstanding the status of the repeater. Thus, even if the repeater is disabled or otherwise malfunctioning such that signals are not relayed with adequate integrity from the host base station antenna to the subscriber antenna, the communicator device will still be able to operate. Having the communicator device connected to the subscriber antenna, by comparison, requires that repeater adequately communicate control information received by the host base station antenna to the subscriber which diminishes the reliability of the communicator device and may result in a loss of control ability.

On the other hand, if the communicator device is intended to perform diagnostic tests on repeater 203, then it may be preferable to have the terminal unit 206 operatively connected to the subscriber antenna 205. A terminal unit connected to the subscriber essentially becomes a terminal unit served by the repeater. This facilitates application level diagnostics as mentioned above since the terminal unit can function as a subscriber relying on the repeater. By comparison, a terminal unit on the host cell antenna would receive the host cell signal and provide no indication of the repeater's performance during an application level test. Therefore, the connection of an antenna to the terminal unit is dependent upon the desired function of the communicator device.

Figure 3:
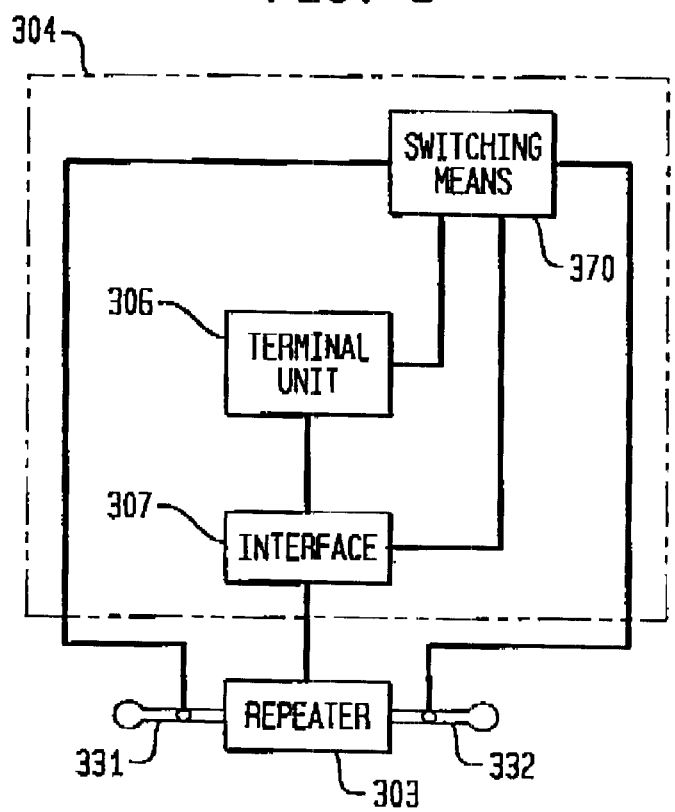
FIG. 3 shows a schematic diagram of an embodiment of the communicator device having switching means.

Since the communicator device may be used for both control and diagnostic functions, it may be desirable to have a terminal unit operatively connected to both antennas. FIG. 3 schematically shows a communicator device 304 that can be connected either to antenna, depending upon the application. The communicator device 304 in this embodiment is similar to that depicted in FIG. 2, except switching means 370 are operatively connected to the interface means 307. Switching means 370 switches the connection of the terminal unit 306 from the host cell antenna 331 to the subscriber antenna 332 according to commands from the user. The switching between the antennas can be performed in different ways. For example, if an application level diagnostic test is desired, then the MSC can direct interface 307 via a command channel to switch the terminal unit 306 to antenna 332. The terminal unit 306 would then be receiving signals as they are broadcasted from the repeater 303. In a preferred embodiment, the communicator device 304 defaults to the host cell antenna 331 in the event the repeater is operatively disabled. This way, the communicator device 304 does not remain connected to antenna 332 and isolated from the user because the repeater cannot relay control signals to the subscriber antenna 332. This default feature can be performed using a simple timer circuit or known programming techniques. For example, if a control signal is not received within a certain period, the interface 307 commands the switching means to revert back to the default position, i.e., the connection with the host base station antenna 331. Although the switching means 370 enables the communicator device to operate from either antenna, it does add complexity to the system and, when the communicator device is connected to the subscriber antenna, it is temporarily beyond the direct control of the user.

Figure 4:
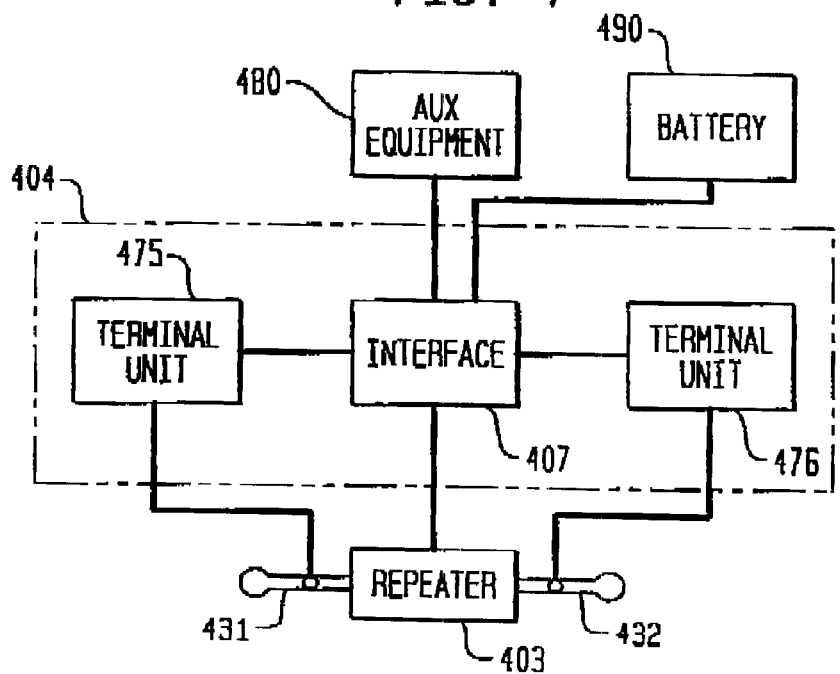
FIG. 4 shows a schematic diagram of an embodiment of the communicator device having two terminal units.

To reduce the complexity of the system and to maintain a constant communication link between the communicator device and the base station, another preferred embodiment of the invention employs two terminal units as shown schematically in FIG. 4. The communicator device of FIG. 4 is substantively similar to the device shown in FIG. 3 except two terminal units 475 and 476 are employed rather than just one. One terminal unit 475 is connected to the host base station antenna 431, while the other terminal unit 476 is connected to the subscriber antenna 432. The control interface 407 is accordingly adapted to interface with two terminal units.

Having a terminal unit on both the base station antenna and the subscriber antenna provides for not only increase control over the unit but also greater specificity in troubleshooting in the repeater system. Problems in a repeater system can occur in the air interface between the base station and the repeater, in the repeater itself, and in the air interface between the terminals and the repeater. A terminal unit connected to antenna 204 provides an indication of the integrity of the signal as it reaches the repeater. A terminal unit connected to the subscriber antenna 405, on the other hand, provides an indication of the signal as it is transmitted to the subscriber base. Therefore, if the terminal unit 475 provides feedback that indicates that an acceptable signal from the base station is being received, but terminal unit 476 provides feedback that indicates that a corrupted signal is being transmitted from repeater, then a determination can be made that the problem lies in the repeater.

In the preferred embodiment, the communicator device shares its power supply with the apparatus. Any known power control means may be connected to the apparatus power to provide power to the communicator device, and in one embodiment it is incorporated into the interface 407. Since the communicator device may be used in remote locations where power is not available or is subject to failure, another preferred embodiment of the communicator device includes means for providing power. The means may include any known power supply such as solar, wind, tidal, or battery. For example, depicted in FIG. 4 is a preferred embodiment of the communicator device having means for accepting a battery back-up 490. The means for accepting the battery 490 are well known in the art and may be integrated into the communicator device. The preferred embodiment may also include a battery itself.

A repeater may serve as a platform for auxiliary wireless equipment 480 as shown in FIG. 4. For example, a component in a mobile terminal location positioning system may be connected to the repeater to provide an indication of a call location within the repeater's subscriber area. The communicator device 404 provides for the transfer of information both data and control between the remote auxiliary equipment 480 and the host base station. When using auxiliary equipment, a multiplexing component to mix auxiliary equipment data and control with repeater data and control may be required.

Obviously, numerous modifications and variations of the present invention are possible in the light of the above teachings. It is therefore understood that within the scope of the appended claims, the invention may be practiced otherwise than as specifically described herein.

What is claimed is:

1. A repeater for use in a wireless system having a mobile switching center (MSC), and at least base station communicatively connected to said MSC, said repeater comprising:

a housing;

means for retransmitting signals to and from said base station, said means for retransmitting being mounted in said housing;

control functionality relating to operations of said repeater, said control functionality mounted in said housing; and a remote communication device mounted in said housing and comprising:

a terminal unit having means for transmitting a signal and receiving a signal, said transmitted signal including an identification of said terminal unit; and a control interface operatively connected to said terminal unit and comprising:

means for operatively connecting to said repeater; and means for interfacing signals of said terminal unit with said control functionality of said repeater.

2. The repeater of claim 1, wherein said repeater has two antennas, a host cell antenna and a subscriber antenna, said terminal unit being operatively connected to one of said antennas.

3. The repeater of claim 1, wherein said terminal unit includes diagnostic means for cooperating with said MSC to perform at least one application level test.

4. The repeater of claim 3, wherein said repeater has two antennas, a host cell antenna and a subscriber antenna, said terminal unit being operatively connected to said subscriber antenna.

5. The repeater of claim 1, further comprising:
an auxiliary input port for connection to an auxiliary apparatus for providing a communicative link between said auxiliary apparatus and said base station.

6. The repeater of claim 5, wherein said auxiliary device is a locator device used to provide an indication of a position of a terminal.

7. A repeater for use in a wireless system having a mobile switching center (MSC), and at least base station communicatively connected to said MSC, said repeater comprising
two antennas, a host cell antenna and a subscriber antenna;
means for retransmitting signals to and from said base station;
control functionality relating to operations of said repeater; and
a remote communication device comprising
a terminal unit having means for transmitting a signal and receiving a signal and diagnostic means for cooperating with said MSC to perform at least one application level test, said transmitted signal including an identification of said terminal unit, wherein said terminal unit is operatively connected to said subscriber antenna;
a second terminal unit, said second terminal being operatively connected to said host cell antenna; and
a control interface operatively connected to said terminal unit and comprising
means for operatively connecting to said repeater; and
means for interfacing signals of said terminal unit with said control functionality of said repeater.

8. A repeater for use in a wireless system having a mobile switching center (MSC), and at least base station communicatively connected to said MSC, said repeater comprising:
two antennas, a host cell antenna and a subscriber antenna;
means for retransmitting signals to and from said base station;
control functionality relating to operations of said repeater; and
a remote communication device comprising
a terminal unit having means for transmitting a signal and receiving a signal and diagnostic means for cooperating with said MSC to perform at least one application level test, said transmitted signal including an identification of said terminal unit;
switching means for switching the connection of said terminal unit from said host antenna to said subscriber antenna; and
a control interface operatively connected to said terminal unit and comprising
means for operatively connecting to said repeater; and
means for interfacing signals of said terminal unit with said control functionality of said repeater.

* * * * *